(12) United States Patent
Juchmes

(10) Patent No.: US 11,305,825 B2
(45) Date of Patent: Apr. 19, 2022

(54) TAILGATE GAP PREVENTION DEVICE

(71) Applicant: Kevin Juchmes, Malaga, WA (US)

(72) Inventor: Kevin Juchmes, Malaga, WA (US)

( * ) Notice: Subject to any disclaimer, the term of this patent is extended or adjusted under 35 U.S.C. 154(b) by 0 days.

(21) Appl. No.: 16/511,146

(22) Filed: Jul. 15, 2019

(65) Prior Publication Data
US 2021/0016842 A1      Jan. 21, 2021

(51) Int. Cl.
*B62D 33/027*      (2006.01)

(52) U.S. Cl.
CPC ................ *B62D 33/0273* (2013.01)

(58) Field of Classification Search
CPC ................................ B62D 33/0273
See application file for complete search history.

(56) References Cited

U.S. PATENT DOCUMENTS

| | | |
|---|---|---|
| 4,763,945 A | 8/1988 | Murray |
| 5,188,415 A | 2/1993 | Wagner |
| D374,854 S | 10/1996 | Little et al. |
| 5,664,822 A | 9/1997 | Rosenfield |
| 5,904,391 A | 5/1999 | Liljenquest et al. |
| D488,115 S | 4/2004 | Trunk et al. |
| D657,725 S | 4/2012 | Segura |
| 8,459,716 B2 | 6/2013 | Kaplan |
| D689,425 S | 9/2013 | Olson |
| 9,016,753 B2 | 4/2015 | Mcdermott, III |
| 2012/0159857 A1* | 6/2012 | Kaplan ............... B62D 33/0273 49/465 |
| 2012/0223541 A1* | 9/2012 | Gianino ............. B62D 33/0273 296/57.1 |
| 2015/0084361 A1* | 3/2015 | McDermott, III . B62D 33/0273 296/57.1 |
| 2016/0221515 A1* | 8/2016 | Burd ....................... B60J 10/84 |
| 2017/0247062 A1* | 8/2017 | Vu ........................ B62D 33/03 |
| 2019/0241219 A1* | 8/2019 | Smith ................ B62D 33/0273 |
| 2019/0322225 A1* | 10/2019 | Smith ..................... B60R 13/01 |
| 2019/0389388 A1* | 12/2019 | Ngo ......................... B60R 3/02 |
| 2020/0198545 A1* | 6/2020 | Townson ........... B62D 33/0273 |
| 2020/0239085 A1* | 7/2020 | Watson .............. B62D 33/0273 |

* cited by examiner

*Primary Examiner* — Lori L Lyjak

(57) ABSTRACT

An illustrated view of a tailgate gap prevention device for preventing a gap between a tailgate and a box of a vehicle. The tailgate gap prevention device is useful for preventing debris, ice, snow, etc. from falling into and being trapped in the gap between the tailgate and the box of the vehicle. The tailgate prevention device provides a quick, easy and safe cleanup of the truck box where the gap is not collecting debris, ice, snow etc. The tailgate gap prevention device has a tailgate bridge and a plurality of hinges. The hinges are screwed onto the tailgate bridge and onto the box of a vehicle. Once installed, spring-loaded hinges will cause the tailgate bridge to slide into position preventing the gap from debris, ice, snow, etc.

13 Claims, 2 Drawing Sheets

TAILGATE GAP PREVENTION DEVICE

FIELD OF THE INVENTION

This invention relates to tailgates. More particularly, it relates to devices to remove tailgate gaps.

BACKGROUND

A pickup truck is a light-duty truck having an enclosed cab and an open cargo area with low sides and tailgate. Once a work tool with few creature comforts, in the 1950s, consumers began purchasing pickups for lifestyle reasons, and by the 1990s, less than 15% of owners reported use in work as the pickup truck's primary purpose. Today in North America, the pickup is mostly used like a passenger car[3] and accounts for about 18% of total vehicles sold in the United States.

Full-sized pickups and SUVs are an important source of revenue for GM, Ford, and FCA's Ram, accounting for more than two-thirds of their global pretax earnings, though the vehicles make up just 16% of North American vehicle production. The vehicles have a high profit margin and a high price, with 40% of Ford F-150s selling for US$40,000 or more.

The cargo bed can vary in size according to whether the vehicle is optimized for cargo utility or passenger comfort. Most have fixed side walls and a hinged tailgate. Cargo beds are normally found in two styles: step-side or fleet-side. A step-side bed has fenders which extend on the outside of the cargo area. A fleet-side bed has wheel-wells inside the bed.

When the tailgate is opened to allow access to the bed, there becomes a gap which can cause injury, loss of product being carried falling through the gap and/or damage to product being loaded into the bed by getting caught on the gap. Therefore, there is a need for a device to cover, remove and/or protect the gap area from the concerns mentioned above.

DETAILED DESCRIPTION

Figure 1:
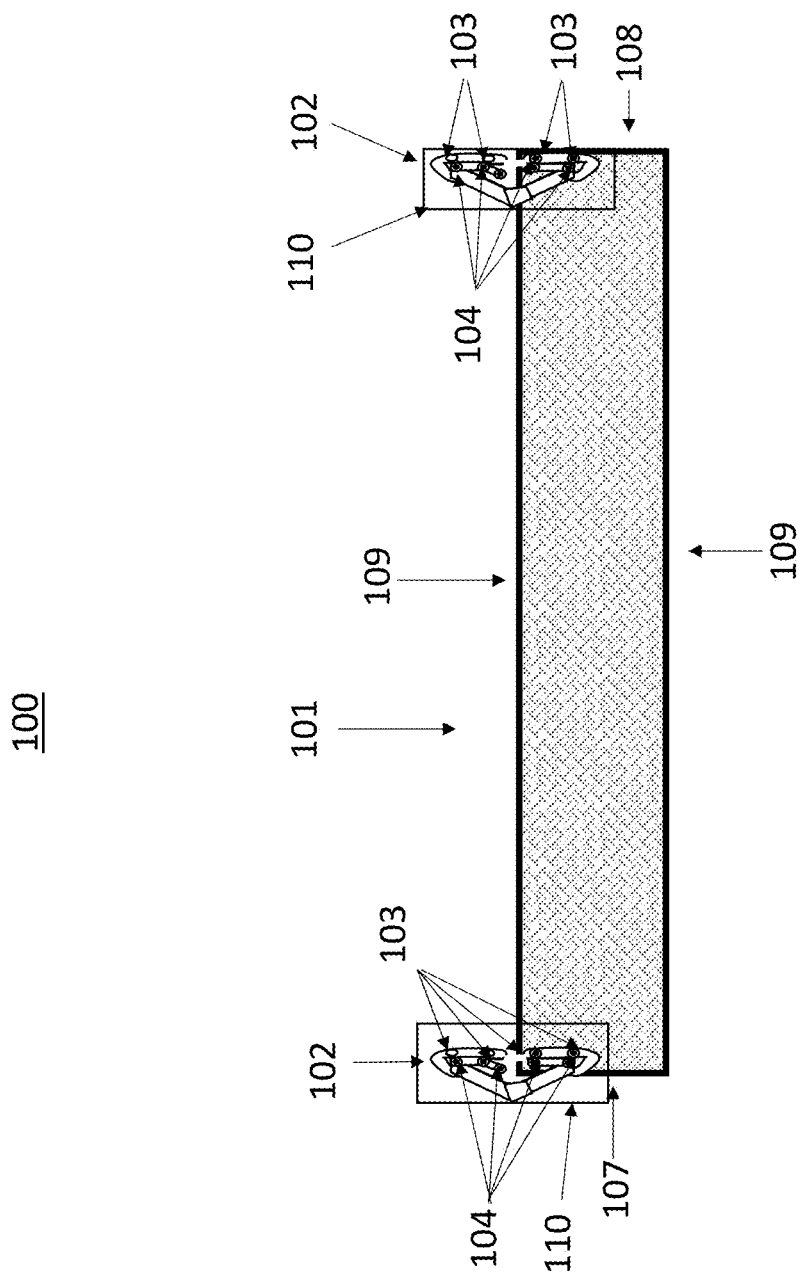
FIG. 1 is an illustrated view of an exemplary tailgate gap prevention device.

The phrases "in one embodiment," "in various embodiments," "in some embodiments," and the like are used repeatedly. Such phrases do not necessarily refer to the same embodiment. The terms "comprising," "having," and "including" are synonymous, unless the context dictates otherwise. Such terms do not generally signify a closed list.

"Above," "adhesive," "affixing," "any," "around," "both," "bottom," "by," "comprising," "consistent," "customized," "enclosing," "friction," "in," "labeled," "lower," "magnetic," "marked," "new," "nominal," "not," "of," "other," "outside," "outwardly," "particular," "permanently," "preventing," "raised," "respectively," "reversibly," "round," "square," "substantial," "supporting," "surrounded," "surrounding," "threaded," "to," "top," "using," "wherein," "with," or other such descriptors herein are used in their normal yes-or-no sense, not as terms of degree, unless context dictates otherwise.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications and equivalents. In alternate embodiments, additional devices, or combinations of illustrated devices, may be added to, or combined, without limiting the scope to the embodiments disclosed herein.

Referring to FIG. 1, an illustrated view of a tailgate gap prevention device 100 for preventing a gap between a tailgate and a box of a vehicle. The tailgate gap prevention device 100 is useful for preventing debris, ice, snow, etc. from falling into and being trapped in the gap between the tailgate and the box of the vehicle. The tailgate prevention device 100 provides a quick, easy and safe cleanup of the truck box where the gap is not collecting debris, ice, snow etc.

The depth of tailgate gap prevention device 100 is preferably fifty-seven and one-fourth (57.25) inches, but other lengths are hereby contemplated including, but not limited to, fifty (50) inches, sixty and one-half (60.5) inches, etc.

The tailgate gap prevention device 100 has a tailgate bridge 101 and a plurality of hinges 102. The tailgate bridge 101 is preferably made of a diamond plated aluminum material, but other materials are hereby contemplated including, but not limited to, steel, stainless-steel, etc. The plurality of hinges 102 are preferably made of a stainless-steel material, but other materials are hereby contemplated including, but not limited to, steel, aluminum, etc.

The tailgate bridge 101 has a first edge 107, a second edge 108 and two-long edges 109. The two-long edges 109 are preferably coated with a Teflon® material, but other materials are hereby contemplated including, but not limited to, silicon, rubber, etc.

The number of the plurality of hinges 102 are preferably eight (8) hinges, but other number of hinges are hereby contemplated including, but not limited to, six (6), four (4), ten (10), etc. The plurality of hinges 102 are preferably spring-loaded snap-over hinges, but other types of hinges are hereby contemplated including, but not limited to, spring-tension hinges, invisible hinges, hand pivot hinges, etc. Each of the plurality of hinges 102 has one of a plurality of boots 110. Each of the plurality of boots 110 are removably coupled to each of the plurality of hinges 102. The plurality of boots 110 provide protection for the plurality of hinges 102. The plurality of boots 110 are preferably made of a rubber material, but other materials are hereby contemplated including, but not limited to, plastic, vinyl, etc.

The plurality of hinges 102 have a plurality of screw holes 103 and screws 104. The screws 104 are preferably zinc plating, but other types of screws are hereby contemplated including, but not limited to, hot-dip galvanized plating, chrome plated, etc. The screws 104 are preferably self-drilling tapping screws. Each of the plurality of hinges 102 are securely coupled to the box of the vehicle by inserting one of the plurality of screws through one of the holes of screw holes 103 of the hinges 102. The screws 104 are then screwed into the box of the vehicle to secure the hinge to the box of the vehicle. (See FIG. 3)

Each of the plurality of hinges 102 are then securely coupled to a first edge 105 or second edge 106 of the tailgate bridge 101. The plurality of hinges 102 are securely coupled to the first edge 107 the second edge 108 of the tailgate bridge 101 by inserting one of the plurality of screws through one of the holes of screw holes 103 of the hinges 102. The screws 104 are then screwed into the tailgate bridge 101 to secure the hinges 102 to the tailgate bridge 101.

Figure 2:
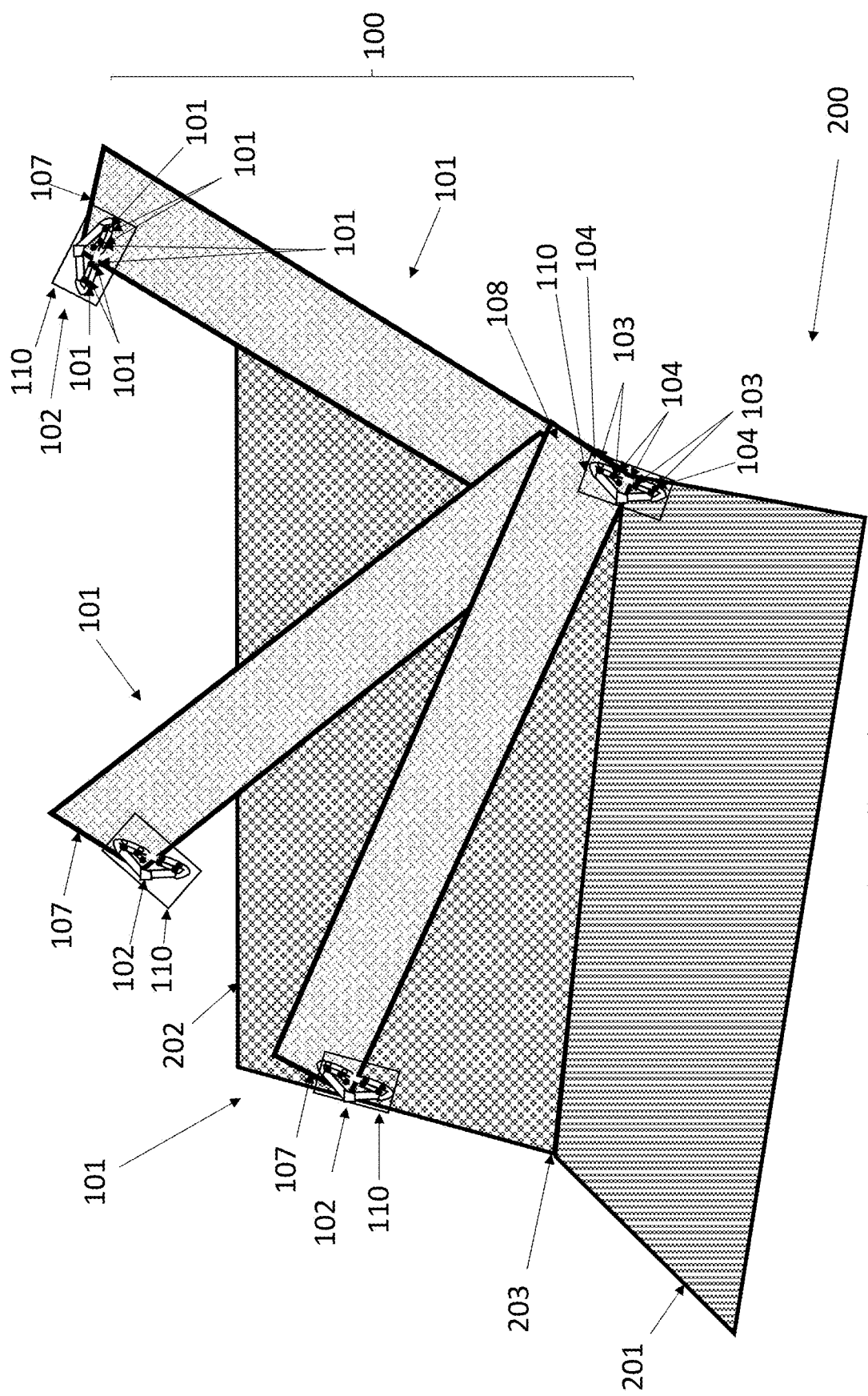
FIG. 2 is an illustrated view showing the device shown installed in a box of a vehicle in FIG. 1.

Now in FIG. 2, an illustrated view of a bed of a vehicle showing the device 100 shown in FIG. 1 being installed is presented.

The device 100 has two hinges 102 coupled securely to the first edge 107 and the second edge 107 of the tailgate bridge 101. Each of the two hinges 102 has two screws 104 inserted through the screw holes 103 and then the screws 104 are screwed into the tailgate bridge 101.

A vehicle 200 has a box 201 and a tail gate 202. The tailgate bridge 101 is coupled to the box 201 of the vehicle 200 by inserting the screws 104 into the screw holes 103. The screws 104 are then screwed into the box 201 of the vehicle 101.

Once the tailgate bridge 101 is fastened to the box 201 using the screws 104, the tailgate 202 may be closed. The tailgate bridge 101 will slide up the tailgate 202 along the coated long-edges 109 of the tailgate bridge 101 thereby setting the hinges 102 to an open position. Once the box 201 of the vehicle 200 is loaded, the tailgate bridge 101 slides down over a gap 203 between the tailgate 202 and the box 201.

In the numbered clauses below, specific combinations of aspects and embodiments are articulated in a shorthand form such that (1) according to respective embodiments, for each instance in which a "component" or other such identifiers appear to be introduced (with "a" or "an," e.g.) more than once in a given chain of clauses, such designations may either identify the same entity or distinct entities; and (2) what might be called "dependent" clauses below may or may not incorporate, in respective embodiments, the features of "independent" clauses to which they refer or other features described above.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

The features described with respect to one embodiment may be applied to other embodiments or combined with or interchanged with the features of other embodiments, as appropriate, without departing from the scope of the present invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A tailgate gap prevention device for protecting a gap of a pickup truck from accumulating debris, ice, snow etc., the device comprising:
   a tailgate bridge, the tailgate bridge being for protecting the gap of the vehicle;
   a plurality of hinges, the hinges having a plurality of screw holes;
   a plurality of screws, the screws being inserted into the screw holes; and wherein the screws being coupled into the first edge and the second edge of the tailgate bridge; and
   the screws being inserted into the screw holes, and wherein the screws being coupled to a bed of a vehicle substantially near a tailgate of the vehicle.

2. The device of claim 1, wherein when the box does not have a load, the hinges being in an open position.

3. The device of claim 1, wherein the device being fifty-seven and one-fourth (57.25) inches in length.

4. The device of claim 1, wherein the tailgate bridge having two long sides.

5. The device of claim 4, wherein at least one of the two long sides being coated.

6. The device of claim 1, wherein the plurality of screws being self-drilling tapping screws.

7. The device of claim 1, wherein the hinges being spring-loaded snap-over hinges.

8. The device of claim 1, wherein the tailgate bridge being made of diamond coated aluminum.

9. The device of claim 1, wherein the plurality of hinges being made of a stainless-steel material.

10. The device of claim 1, wherein the plurality of screws being coated with a zinc material.

11. The device of claim 1, wherein the plurality of hinges further comprising:
    a plurality of boots, each of the plurality of boots being removably coupled to each of the plurality of hinges.

12. The device of claim 11, wherein the plurality of boots being made of a rubber material.

13. The device of claim 12, wherein the plurality of boots being made of a plastic material.

* * * * *